(12) United States Patent  
Sella et al.

(10) Patent No.: US 8,589,524 B1
(45) Date of Patent: Nov. 19, 2013

(54) ADJUSTING NETWORK SERVICE LEVEL BASED ON USAGE (71) Applicant: TW Telecom Holdings Inc., Littleton, CO (US)

(72) Inventors: William Thomas Sella, Parker, CO (US); Pete Joseph Caputo, II, Highlands Ranch, CO (US); James Michael Sella, Parker, CO (US); Harold Wayne Teets, Highlands Ranch, CO (US); Travis Duane Ewert, Highlands Ranch, CO (US)

(73) Assignee: tw telecom holdings inc., Littleton, CO (US)

( * ) Notice: Subject to any disclaimer, the term of this patent is extended or adjusted under 35 U.S.C. 154(b) by 0 days.

(21) Appl. No.: 13/943,690

(22) Filed: Jul. 16, 2013

(51) Int. Cl.
*G06F 15/177* (2006.01)

(52) U.S. Cl.
USPC ........................................................ 709/221

(58) Field of Classification Search
USPC ........................................................ 709/221
See application file for complete search history.

(56) References Cited

U.S. PATENT DOCUMENTS

| | | |
|---|---|---|
| 5,101,402 A | 3/1992 | Chiu et al. |
| 6,412,000 B1 | 6/2002 | Riddle et al. |
| 6,526,044 B1 | 2/2003 | Cookmeyer, II et al. |
| 6,873,600 B1 | 3/2005 | Duffield et al. |
| 7,403,988 B1 | 7/2008 | Blouin et al. |
| 7,706,291 B2 | 4/2010 | Luft et al. |
| 7,773,536 B2 | 8/2010 | Lloyd et al. |
| 7,788,354 B2 | 8/2010 | Nag |
| 7,940,676 B2 | 5/2011 | Griffin et al. |
| 7,970,930 B2 | 6/2011 | Dobbins et al. |
| 2011/0196971 A1 | 8/2011 | Reguraman et al. |
| 2012/0134497 A1 | 5/2012 | Roitshtein et al. |

*Primary Examiner* — Jerry Dennison
(74) *Attorney, Agent, or Firm* — Sterne, Kessler, Goldstein & Fox PLLC (57) ABSTRACT

A user of a network service (such as an Ethernet e-line) can specify rules defining changes to the network service under particular usage conditions (for example threshold bandwidth utilization). The network's usage is monitored. When particular usage conditions are detected, the network service is evaluated to determine what switches need to be configured and how to configure them. The switches are configured accordingly. When the usage conditions no longer exist, the switches are re-configured to their original service level.

21 Claims, 10 Drawing Sheets

ADJUSTING NETWORK SERVICE LEVEL BASED ON USAGE

BACKGROUND

1. Field

This field is generally related to service allocation in a data communication network.

2. Related Art

Many applications, such as data storage, processing, and presentation applications, utilize a communication network in their operation. The communication network may, for example, provide a network connection that allows data to be transferred between two geographically remote locations. To produce the network connection, outside service providers may utilize a network spanning multiple network devices from different manufacturers.

To implement a network application, a business may request that the service providers maintain a network service at a particular service level, such as a specific level of bandwidth, latency, or jitter. For example, a business may request an Ethernet connection between two of its locations with a bandwidth of 400 Mbit/second.

While utilizing network services is beneficial in some respects, it also makes applications more dependent on the underlying network services supplied by outside service providers. Because of this dependency, some businesses may have difficulty requesting a network service that meets the requirements of their applications. For example, applications may require different service levels at different times. This difficulty may make businesses reluctant to move their applications into the cloud or to utilize outside service providers for their network services.

BRIEF SUMMARY

In an embodiment, a system adjusts capacity on a network. The network includes a plurality of interconnected switching devices. The system includes several modules including a user interface module that receives an input that identifies a network connectivity service and a rule. The network connectivity service is provisioned to a user at an initial service level, and the rule specifies: (i) a usage metric for the network connectivity service, (ii) a condition for assessing the usage metric, and (iii) a manner for determining a new service level of the network connectivity service, the network connectivity service providing a dedicated network connection between at least two locations. A service lookup module identifies which of the plurality of interconnected switching devices on the network need to be configured to alter the initial service level of the network connectivity service. A monitor module monitors the network to repeatedly evaluate the usage metric. A condition module determines that the usage metric satisfies the condition. When the condition is determined to be satisfied, a usage module determines the new service level of the network connectivity service in the manner specified in the rule. When the condition module determines that the condition is satisfied, a provisioning module configures each of the interconnected switching devices identified to provide the new service level.

Method and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As mentioned above, business applications that utilize network services may require different service levels at different times. Embodiments relate to varying the network service level over time. In some situations, a change in the required service level may be known in advance. For example, an application may utilize a dedicated network connection between two locations at 400 Mbit/s. In addition, the application may have a scheduled backup that occurs between the two locations at a particular time period. While 400 Mbit/s may be generally sufficient, during the backup, more bandwidth may be required, perhaps double. In one embodiment, a user may schedule an increase in bandwidth for that particular time period. At the start of the time period, the allocated bandwidth doubles to 800 Mbit/s, and, at the end of the time period, the allocated bandwidth returns to 400 Mbit/s.

In other circumstances, the specific change in the required service level may not be known in advance. To deal with these situations, some embodiments dynamically change the service level according to real-time usage of the network service. In these embodiments, a user may set up a business rule that specifies how to change a service level given a particular usage level. For example, a user may set up a business rule that states that allocated bandwidth should be doubled when the bandwidth utilized exceeds a particular threshold. A plurality of these rules may be determined based on the Service Level Agreement (SLA) between the service provider and the user. By dynamically changing bandwidth allocation, users can easily augment their network bandwidth to meet the fluctuating demand of their applications.

The Detailed Description that follows is divided into three sections. The first section describes, with respect to FIG. 1, a network that includes a plurality of interconnected switching devices and provides a dedicated network connection between at least two locations. The second section describes, with respect to FIGS. 2-8, a system for altering the service level of the dedicated network connection at a scheduled time. The third section describes, with respect to FIGS. 9 and 10, a system for altering the service level of the dedicated network connection at a scheduled time.

Networks

Figure 1:
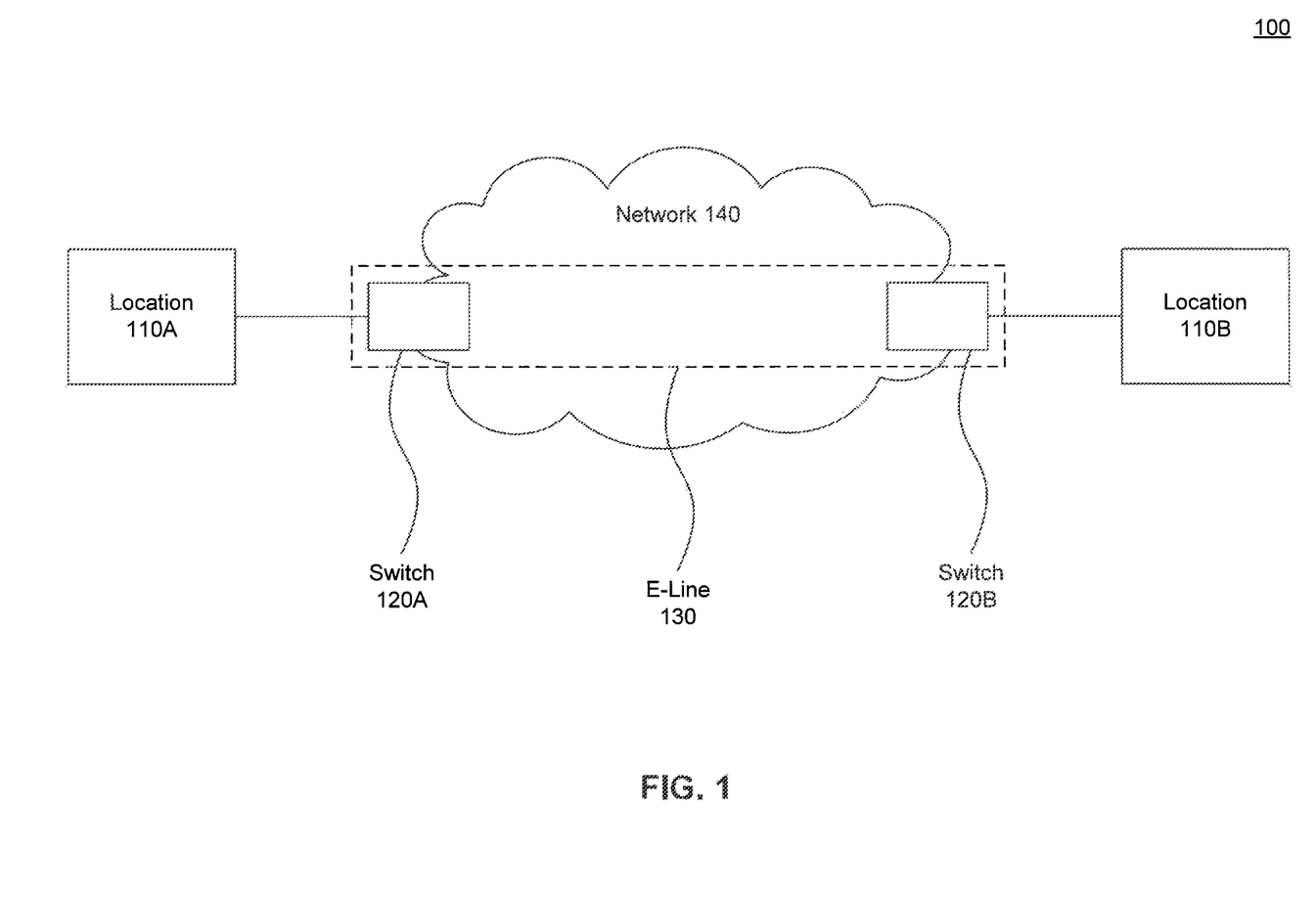
FIG. 1 is a diagram that illustrates a system that provides a connection to a user of a network.

FIG. 1 illustrates a system 100 that provides a communication network 140. The communication network 140 may be a local area network (LAN), metropolitan area network (MAN), or wide area network (WAN). It may utilize any point-to-point or multipoint-to-multipoint networking protocols. Network access protocols used may include Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), or Multiprotocol Label Switching (MPLS).

System 100 provides connection 130 between locations 110A and 110B. The locations 110A and 110B are connected to switching devices 120A and 120B at the edge of the network. Switching devices 120A and 120B may, for example, be access switches that serve as interfaces between end users or routers and the network 140. They may be connected by a network of communications links, other switches, and routers. The term "switching device" as used herein refers to both network switches and routers.

Connection 130 may be a dedicated network connection. A dedicated network connection is a connection with bandwidth reserved for a particular user. In other words, no other user of the network can have access to the bandwidth reserved for a particular user on a dedicated connection. Reserving may involve associating a particular bandwidth with a user. While still reserving bandwidth, a network may be oversubscribed, meaning that if all users were using all their associated bandwidth, the network would have insufficient capacity. A dedicated network connection can be seen as a private connection to one user. Such a dedicated network connection may be point-to-point, in which the connection connects two points on the network. The dedicated network connection may be public or private. On the other hand, the connection may also be multipoint-to-multipoint, in which a set of one or more points on the network is connected to a second set of one or more network points. A switching device may receive traffic for a particular network connection on a particular port.

In an example, communication network 140 may utilize an Ethernet protocol. In that example, connection 130 may be an Ethernet E-Line. E-Line is a data service defined by the Metro Ethernet Forum, providing a point-to-point Ethernet connection between a pair of user network interfaces.

The connectivity provided by connection 130 may have particular, pre-defined service levels. For example, connection 130 may transfer data between locations 110A and 110B at a particular bandwidth, latency, or jitter. Bandwidth is the amount of data that a communication line can transfer over a particular time period, often measured in bit per second (bps) or multiples of it (for example Mega bit per second or Mbps). Latency is a time delay of a communication line. In other words, latency is the amount of time that elapses between when a datum is transmitted and when it is received. Jitter represents variations in time delay, such as a deviation from an average signal latency.

Embodiments dynamically update the service level of network connectivity services, such as connection 130, based on either a pre-defined schedule or usage, as described below in turn.

Scheduled Service Level Adjustment

Figure 2:
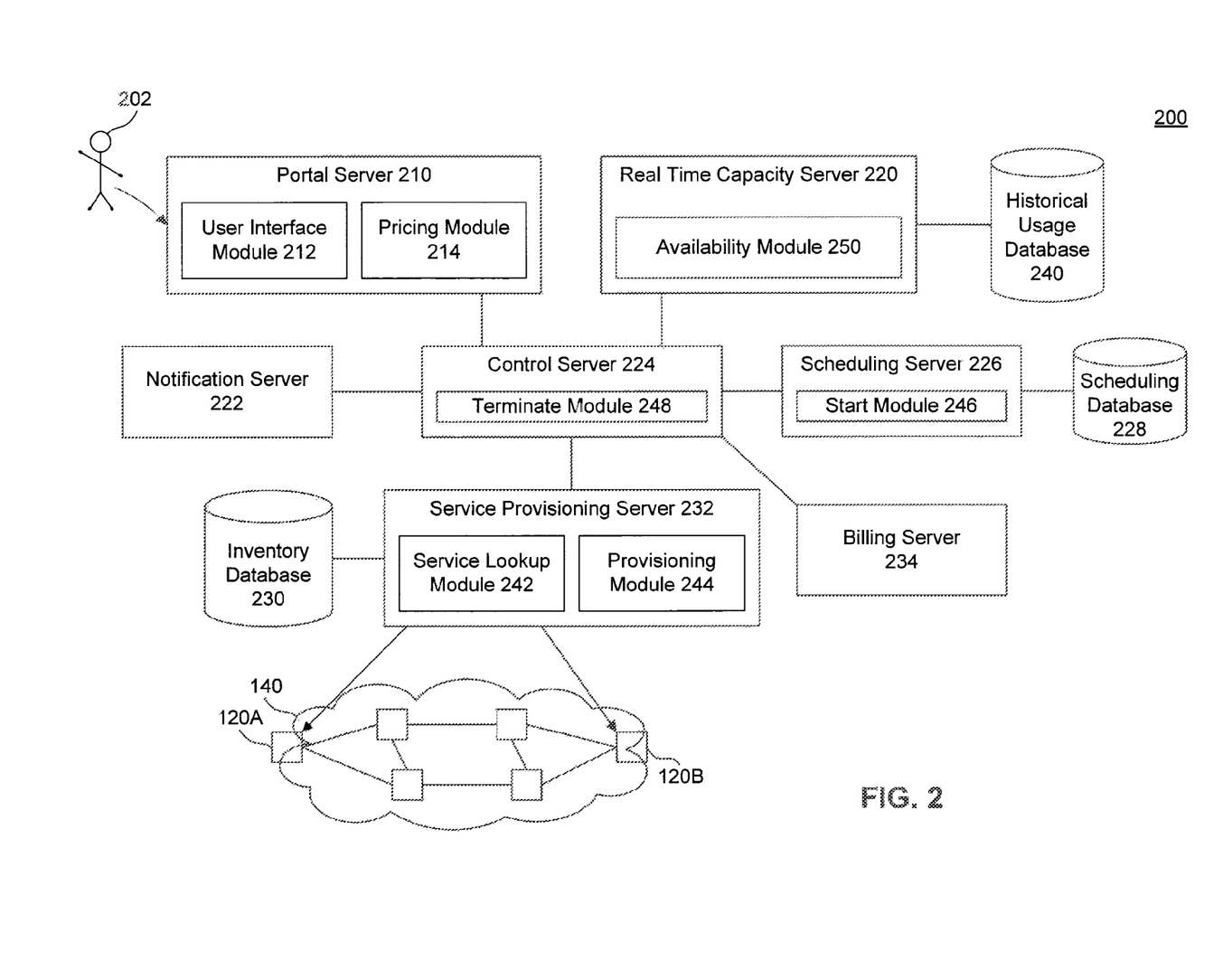
FIG. 2 is a diagram that illustrates a system for dynamically adjusting a service level of a network connectivity service on a scheduled basis.

FIG. 2 is a diagram of a system 200 for adjusting a service level of a network connectivity service on a scheduled basis. To adjust the service level, system 200 includes a number of servers: a portal server 210, a real-time capacity server 220, a notification server 222, a control server 224, a scheduling server 226, a service provisioning server 232, and a billing server 234. Each is described below.

Portal server 210 enables a user 202 to control its network connectivity services. Portal server 210 may be implemented, for example, as a web interface, such as the interface illustrated below with respect to FIG. 6. Portal server 210 may provide a feature for the user to login with credentials. Portal server 210 comprises a user interface module 212 and a pricing module 214.

User interface module 212 displays the assigned service level and schedule with any change to the service level. In an embodiment, user interface module 212 may receive an input that identifies (i) a network connectivity service provisioned to a user, (ii) a time period in the future, and (iii) a new service level requested for the network connectivity service during the time period in the future. User interface module 212 may also enable a user to specify a periodic time period. In other words, a time period that repeats cyclically, such as weekly or monthly.

Pricing module 214 determines a price for the service change specified using user interface module 212. In particular, pricing module 214 determines a price for providing the new service level specified using user interface module 212 during the time period specified using user interface module 212. Pricing module 214 determines the price based on the duration of the time period, a difference between the new and already provisioned service levels, and a pre-defined rate. The pre-defined rate may be specified in a rate table. In the example where the total allowed bandwidth is increased, the rate table may specify a price per hour for each megabit per second above the already provisioned bandwidth. By multiplying a value in the rate table with the difference between the new and already provisioned service levels, pricing module 214 may determine price per hour for providing the new service level.

In addition to determining a price, user interface module 212 may verify the feasibility of a requested change. For example, the requested change by the user may not be achievable due to physical limitations of connections. If the customer only has a 1 Gb/s Ethernet line, then the user cannot request more than 1 Gb/s. In addition to checking the customer's connection, user interface module 212 may check the capacity of the underlying network by sending a query through control server 224 to capacity server 220.

Real time capacity server 220 includes an availability module 250 that predicts future bandwidth availability based on historical data. For example, availability module 250 may use the past bandwidth consumption of the network devices that provide the network connectivity service to determine the feasibility of the requested bandwidth based on the past bandwidth consumption. How the feasibility is verified is described in greater detail below with respect to FIG. 7.

With the feasibility of the operation verified, user 202 may request the alteration. The request is sent from portal server 210 to control server 224.

Control server 224 is an orchestration component. According to the request from portal server 210, it implements a state machine showing what state the system is in at any point in time. Also, control server 224 may receive requests from components other than portal server 210, such as APIs or the user's proprietary portal.

After control server 224 receives a scheduling request, it passes the request on to scheduling server 226. Scheduling server 226 is connected to a scheduling database 228, which stores the requests, such as a scheduled future event. Scheduling server 226 also includes a start module 246.

Start module 246 monitors scheduling database 228 and the current time. When start module 246 observes that the current time is at or near the scheduled start time, start module 246 determines that the time period identified in the input received by the user interface module is beginning and starts processing the scheduling request. For example, if the user schedules the bandwidth on a connection from Atlanta to Los Angeles to be doubled on Friday at 11 pm for 48 hours, start module 246 begins processing the scheduling request on Friday at or near 11 pm. To process the scheduling request, start module 246 may send a message to control server 224 with the service to be changed, how and when service is to be changed, and the quoted price.

Once control server 224 receives a message from start module 246 to process a change in the bandwidth of a connection, it sends a request to service provisioning server 232.

Service provisioning server 232 configures the network to achieve the requested change. Service provisioning server 232 includes a service lookup module 242 and a provisioning module 244 and is connected to an inventory database 230. Inventory database 230 stores the physical and logical inventory of the currently provisioned network connectively services and the devices that they each utilize. For example, inventory database 230 may store information on the switching devices, and in particular, the endpoint switching devices used by each E-Line.

In response to the request from control server 224, service lookup module 242 uses the inventory database 230 to identify which of the plurality of interconnected switching devices on communication network 140 need to be configured to alter the network connectivity as requested by the user. For example, service provisioning server 232 identifies an endpoint device for each of the locations connected using the network connectivity services, such as locations 120A and 120B in FIG. 2.

Once service lookup module 242 identifies each of the interconnected switching devices, provisioning module 244 configures the switching devices to provide the requested bandwidth to the user. For example, provisioning module 244 may send configuration commands to each of the switching devices. In one embodiment, each endpoint device may include a policer that limits bandwidth on a port associated with the user. To configure the endpoint device, the service provisioning server alters the policer included on each of the endpoint devices to limit the bandwidth on the port associated with the user to the second bandwidth indicated by the user.

In one embodiment, the plurality of interconnected switching devices may be heterogeneous. For example, some of the switching devices may be switches made by Cisco System, Inc. of San Jose, Calif. and others may be switches made by Juniper Networks, Inc. of Sunnyvale, Calif. Configuring these different types of switches may require different commands. To deal with this problem, provisioning module 244 may first look up the necessary commands from inventory database 230 for each type of switch. In an example, provisioning module 244 may utilize different sub-modules which understand the mapping of generic attribute models to the specific configuration instruction set of the device being modified. Then, provisioning module 244 may send the appropriate type-specific commands to each of the switching devices.

If able to provision the services without error, service provisioning server 232 updates the inventory database to indicate the new service level of the network connectivity server and signals back to control server 224, informing it that the requested changes are complete. Then, control server 224 updates the state for that particular connection to reflect the new bandwidth assigned to it. After a change is made to a connection, service provisioning server 232 also updates the inventory, so that it will reflect the change of the conventions in the network.

After the requested change is performed, control server 224 updates its internal state and sends a message to a notification server 222 to notify the user that the change has occurred. The notification may, for example, be made by email, phone call, Short Message Service (SMS), or the updating of an API. The information that is sent to the user may include any potential difference between the requested change and the actual change that was accomplished.

In updating its internal state, control server 224 notifies a termination module 248 that the service level has been updated. Terminate module 248 monitors the current time, comparing it to the time when the change in service is scheduled to end. When terminate module 248 determines that the time period for the change has ended, it sends a message to service provisioning server 232 to return the network connectivity service to its previous service level.

Service provisioning server 232 returns the network connectivity service to the previous service level in the same manner it altered the network connectivity service to provide the new service level. It determines the necessary switching devices and sends the necessary commands to the determined switching devices.

Once the network connectivity service returns to the original service level, service provisioning server 232 sends a message to billing server 234 with the initially quoted price and the duration of the change. Billing server 234 determines the amount to charge the user and bills the charge to the customer.

In examples, messages between the server modules in FIG. 2 can be transmitted using Advance Message Queuing Protocol (AMQP), Simple Object Access Protocol (SOAP), Representational state transfer (REST), and Java Message Service (JMS).

Additional details and examples of operation of the components of FIG. 2 are provided below with respect FIGS. 3-8.

Figure 3:
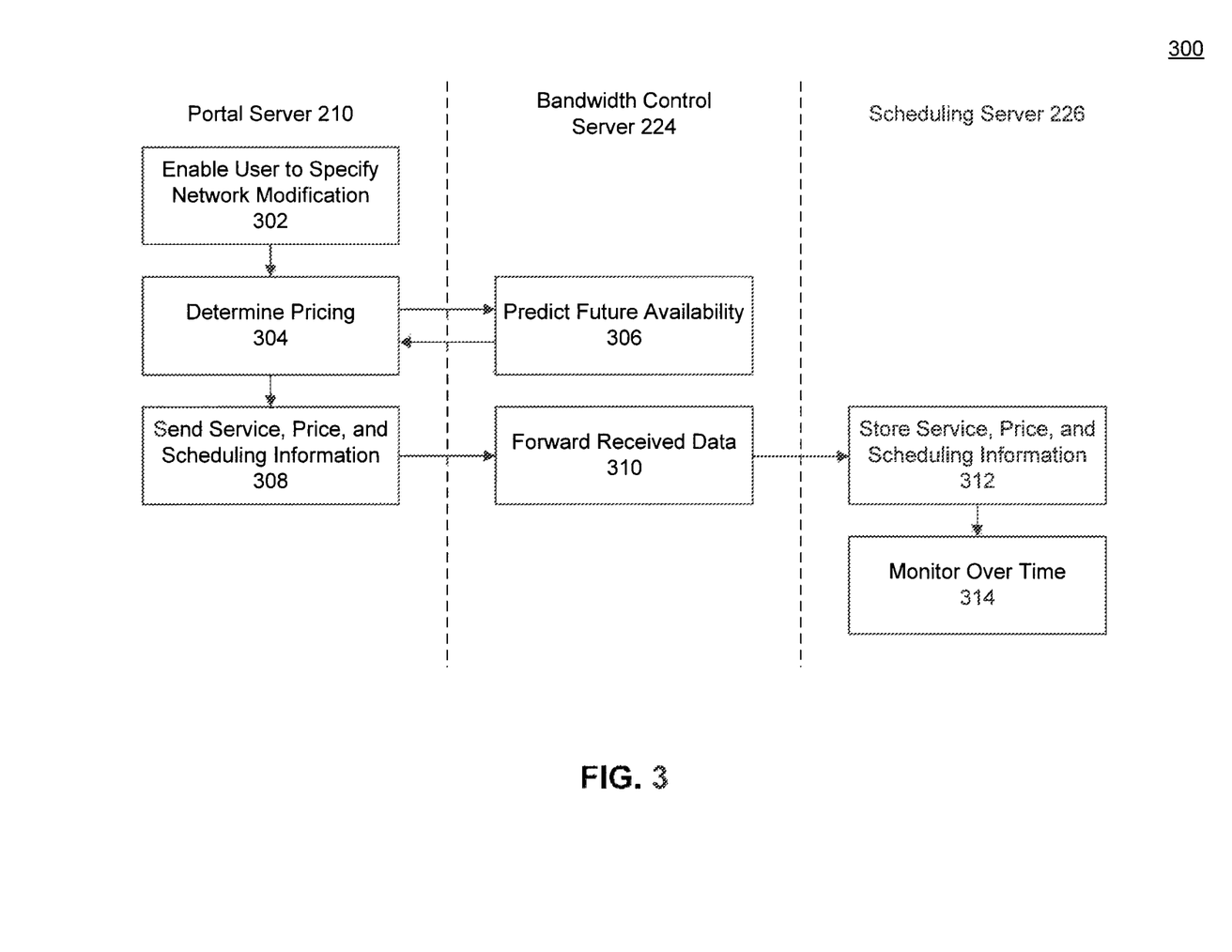
FIG. 3 is a flowchart that illustrates a method to set up a scheduled change in a network service level, which may be used in the system of FIG. 2.

FIG. 3 is a flowchart that illustrates a method 300 to set up a scheduled change in a network service level. While method 300 is described with respect to the components of FIG. 2, a skilled artisan would recognize that the steps of method 300 may be executed by other components as well.

Method 300 begins at step 302 with portal server 210 enabling the user to specify the network modification. For example, a user can request using the portal server 210 that the bandwidth on the connection from Atlanta to Los Angeles be doubled from 400 Mbs to 800 Mbps starting at 11 am on Friday for 4 hours and that this be a recurring event that takes place every week.

At step 304, portal server 210 determines pricing information for the network modification. For example, the cost for 100 Mbps in additional bandwidth may be $10 per hour. Because the example modification calls for 400 Mbps in additional bandwidth, the price may be $40 per hour.

At step 306, bandwidth control server 224 coordinates with real-time capacity server 220 in FIG. 2 to predict future availability. In the example above, real-time capacity server 220 may evaluate utilization of network switches from Atlanta to Los Angeles on previous Fridays from 11 am to 3 pm to determine if there is 400 M/bps in additional capacity. Additionally, it may look at other events which are scheduled to occur and take their future consumption into account when determining feasibility.

At step 308, portal server 210 sends service, price and scheduling information to control server 224. Then, at step 310, control server 224 forwards the received data to scheduling server 226. Scheduling server 226 stores service, price and scheduling information at step 312 and monitors this information at step 314.

Figure 4:
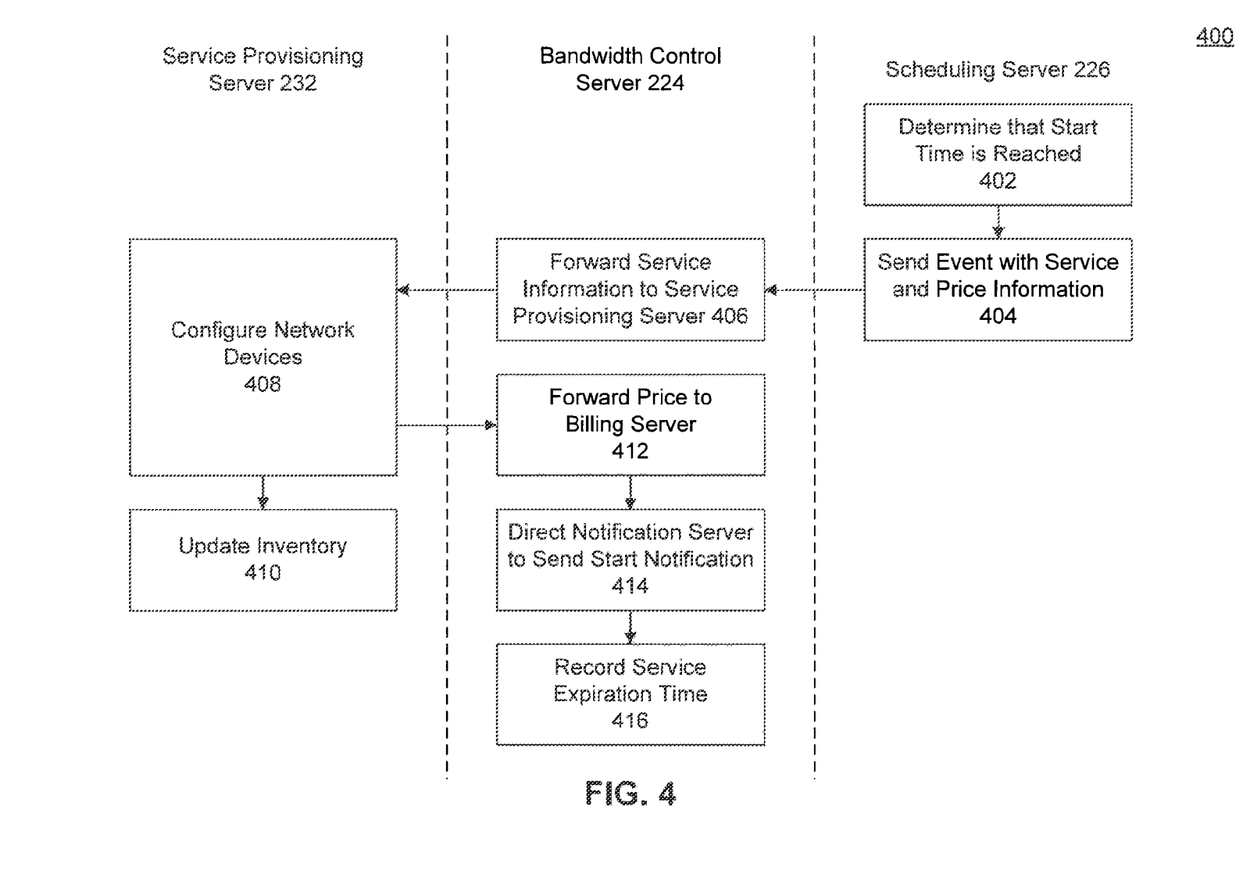
FIG. 4 is a flowchart that illustrates a method to adjust a service level of a network connectivity service, which may be used in the system of FIG. 2.

FIG. 4 is a flowchart that illustrates a method 400 to adjust a service level of a network connectivity service, which may be used in the system of FIG. 2. While method 400 is described with respect to the components of FIG. 2, a skilled artisan would recognize that the steps of method 400 may be executed by other components as well.

Method 400 begins at step 402 when scheduling server 226 determines that the scheduled start time is reached. For example, if the user requested a bandwidth increase at 11 am on Friday, scheduling server 226 determines that the current time is at or near 11 am on a Friday.

At step 404, scheduling server 226 sends an event with service and price information to control server 224. In the example above, the event information may identify: the network connection between Atlanta and Los Angeles, the new bandwidth of 800 Mbps, the quoted price of $40 per hour, and the duration of 4 hours. Scheduling server 226 may send all of this information to bandwidth control server 224.

At step 406, bandwidth control server 224 forwards the service information to the service provisioning server 232. Service provisioning server 232 configures the network devices at step 408. More details on how the network devices may be configured is provided with respect to FIG. 5.

Once the network switches are configured, service provisioning server 232 updates an inventory database, such as inventory database 230 in FIG. 2, with the new service level information at step 410. In the running example, the inventory database may have an entry listing service level information for the network connection between Atlanta and Los Angeles. The entry may be updated to change the bandwidth from 400 MBps to 800 Mbps.

Moreover, once the network switches are configured, service provisioning server 232 indicates that the configuration is complete to bandwidth control server 224. At step 412, bandwidth control server 224 forwards the price to a billing server, such as a billing server 234 at step 412. In the running example, the billing server may receive the quoted price of $40/hr and the duration of 4 hours and bill the customer $160. While step 412 is shown here immediately after configuring the switches to the new service level, a skilled artisan would recognize that it may instead occur after the switches are reconfigured back to the original service level.

Finally, bandwidth control server 224, at step 414, directs notification server 222 to notify the user of the change in the service level and, at step 416, records the service expiration time.

Figure 5:
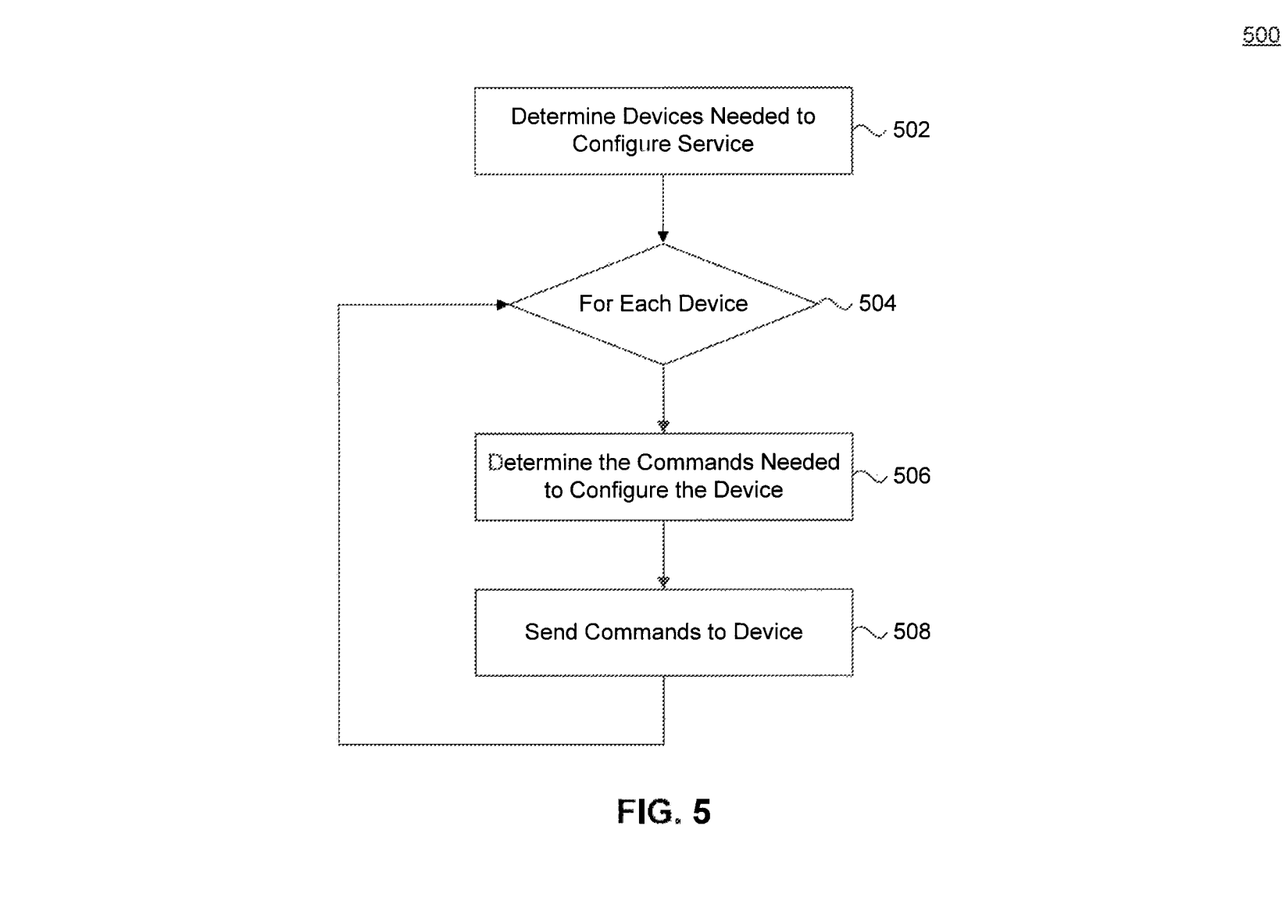
FIG. 5 is a flowchart that illustrates a method for configuring devices on a network to alter a service level of a network connectivity service.

FIG. 5 is a flowchart that illustrates a method 500 for configuring devices on a network to alter a service level of a network connectivity service. Method 500 may, for example, be used in operation of service provisioning server 232.

In step 502, service provisioning server 232 determines the devices needed to configure a service. For example, the device needed to configure a service may be the endpoint device for the service. In other examples, intermediate devices may need to be configured as well.

As illustrated by decision block 504, for each device, service provisioning server 232 executes steps 506 and 508. At step 506, service provisioning server 232 determines the commands needed to configure the device. As mentioned above, the different switching devices may have different types and may have different command interfaces. To deal with this, service provisioning server 232 may look-up the appropriate commands for a particular type of switching device. At step 508, provisioning server 232 sends the command to the device.

Referring to the example above, two switches may need to be altered to change the bandwidth on the E-line between Atlanta and Los Angeles: an endpoint switch in Atlanta, and an endpoint switch in Los Angeles. Step 504 identifies these two switches. The Atlanta endpoint switch may have a different type than the Los Angeles endpoint switch. But, both the Atlanta and Los Angeles endpoint switches may have policers that limit bandwidth to them to a particular level. Step 506 determines a set of commands needed to configure each policer, and step 508 sends each set of commands to the respective device.

Figure 6:
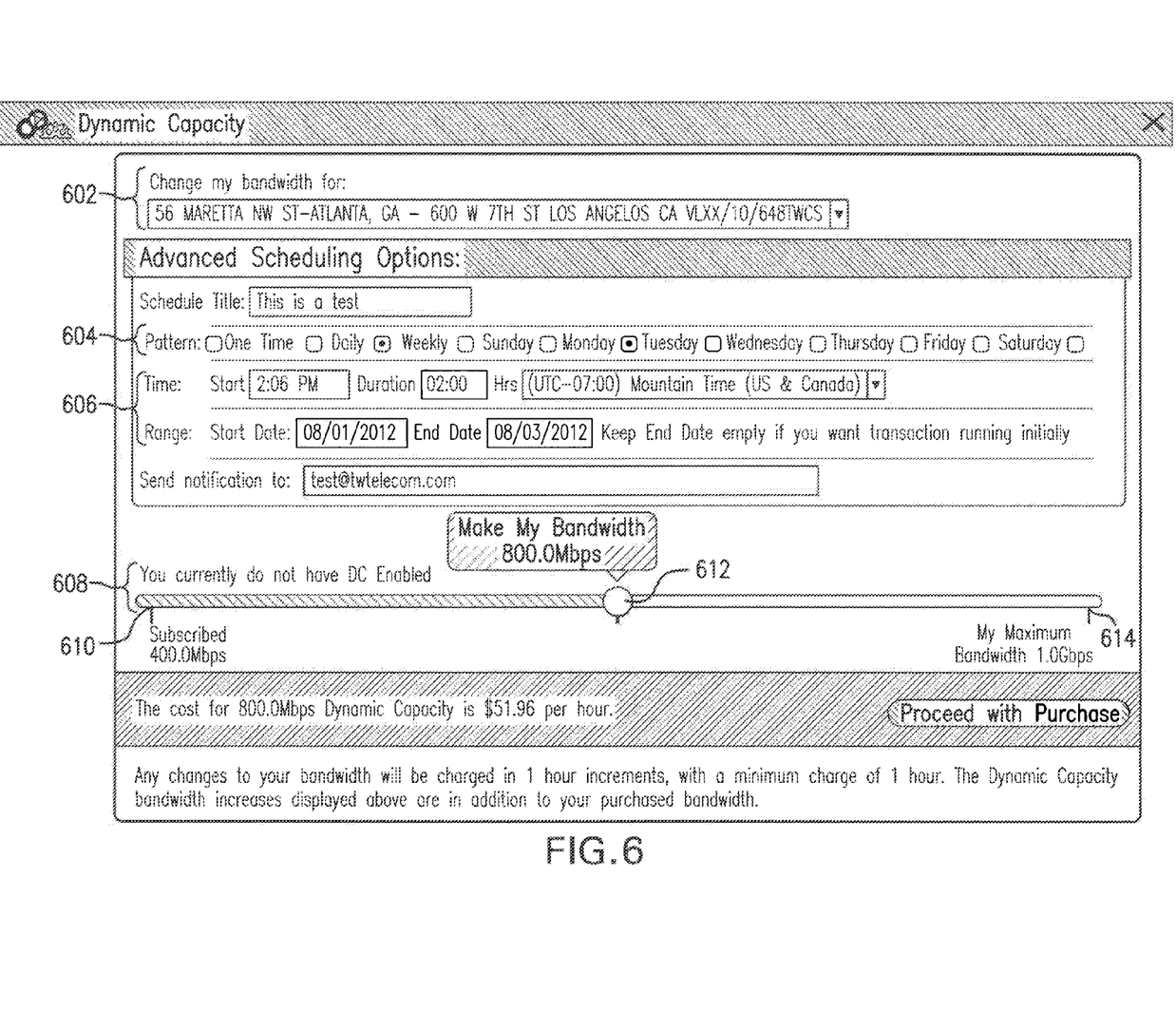
FIG. 6 illustrates an interface to schedule a change in the service level.

FIG. 6 shows an example interface 600 enabling a user to control the bandwidth assigned to any connection in the network associated with that user. A user can change the bandwidth of any such connection by selecting it from menu 602. The user also can choose to have the change in the bandwidth to be effective immediately, happen "one time" in the future, or to occur periodically in the future by selecting from pattern options 604 and time and range in 606.

The user can choose the amount of bandwidth for purchase using the sliding selector 612. The maximum allowable bandwidth is the capacity of the connection assigned to the customer or an upper limit set by the network provider.

After selecting the desired bandwidth, the user can see in real time the cost per Mbps per how, as well as the total cost associated with the selected bandwidth and time. Based on this information, the user can make a decision on whether to purchase the required bandwidth or schedule the payment for the future.

Figure 7:
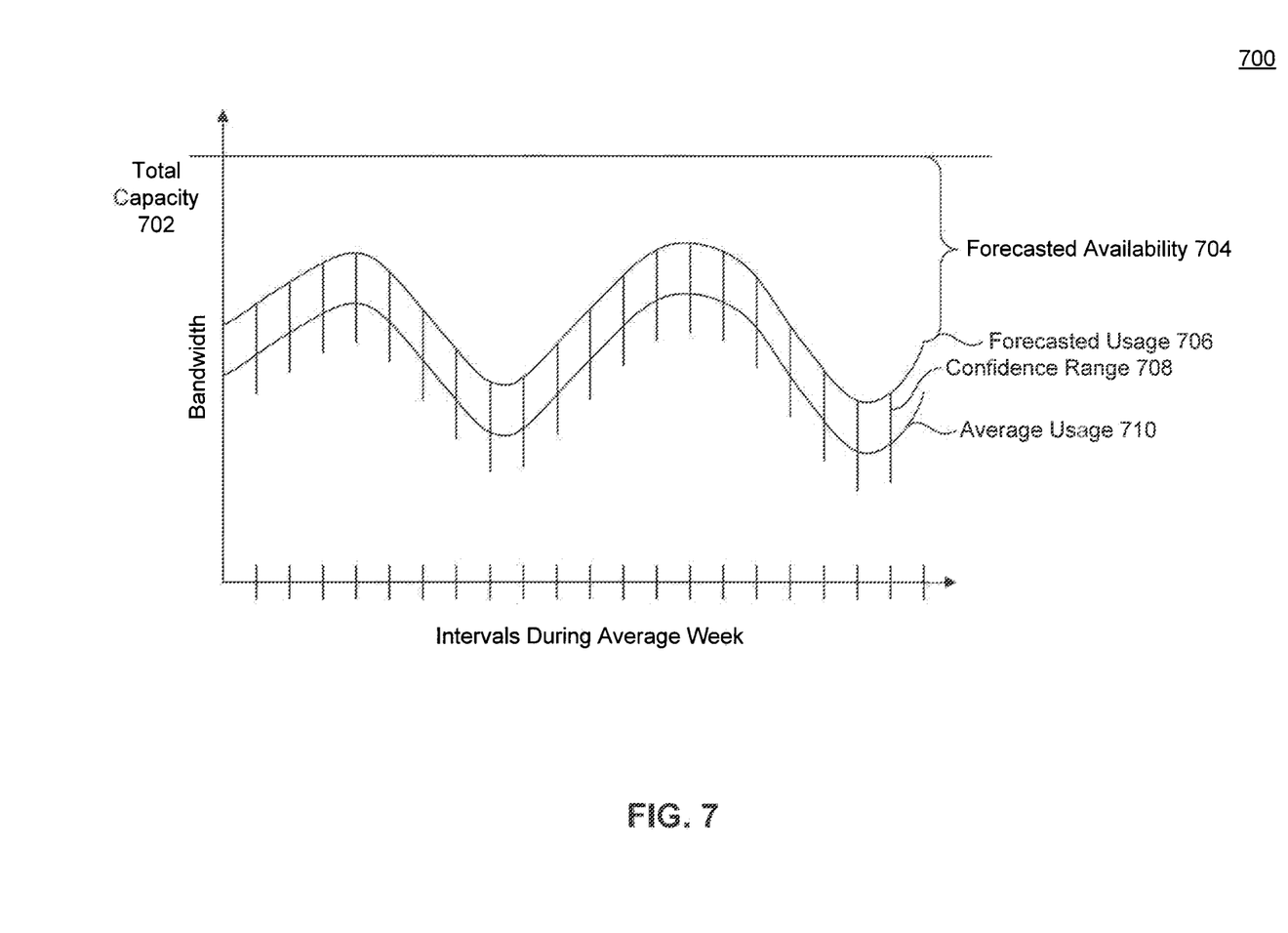
FIG. 7 is a chart that illustrates how the periodic bandwidth usage in the network may be used to forecast future availability.

FIG. 7 shows a chart 700 that illustrates how the periodic bandwidth usage in the network may be used to forecast future availability.

As illustrated in the FIG. 7, typical utilization of some network resources, such as bandwidth, has a cyclic recurring pattern to it. Based upon what the real time capacity server 220 has collected off the network devices and has learned over time, the real time capacity server 220 calculates an average usage 710 of bandwidth for each five minute time interval throughout a one week time period. Each five minute period may include data which fits that particular time slice as well as a pre-determined surrounding time range (+/−1 hour for example). In example, the data may take into account a deviation without the surrounding time range. A skilled artisan would recognize that other intervals and periods may be used. In addition to the average, the variance may also be used to determine a confidence range 708 of usage for each interval with a particular confidence level. The maximum of the range is forecasted usage 706.

For example, during a particular interval, an average utilization may be 400 Mbps. Given known statistical techniques, for a particular variance, the confidence range may be determined with 95% confidence to be from 300 Mbps to 500 Mbps. In that case, the forecasted usage 706 is 500 Mbps.

The total capacity 702 is the total capacity available in the network between the two locations. The difference between the total capacity 702 and the highest forecasted usage 706 for the time period of the scheduled increase is determined as the forecasted availability 704. If the forecasted availability 704 meets or exceeds the additional bandwidth requested, then the portal server 210 in FIG. 2 allows the bandwidth request.

Figure 8:
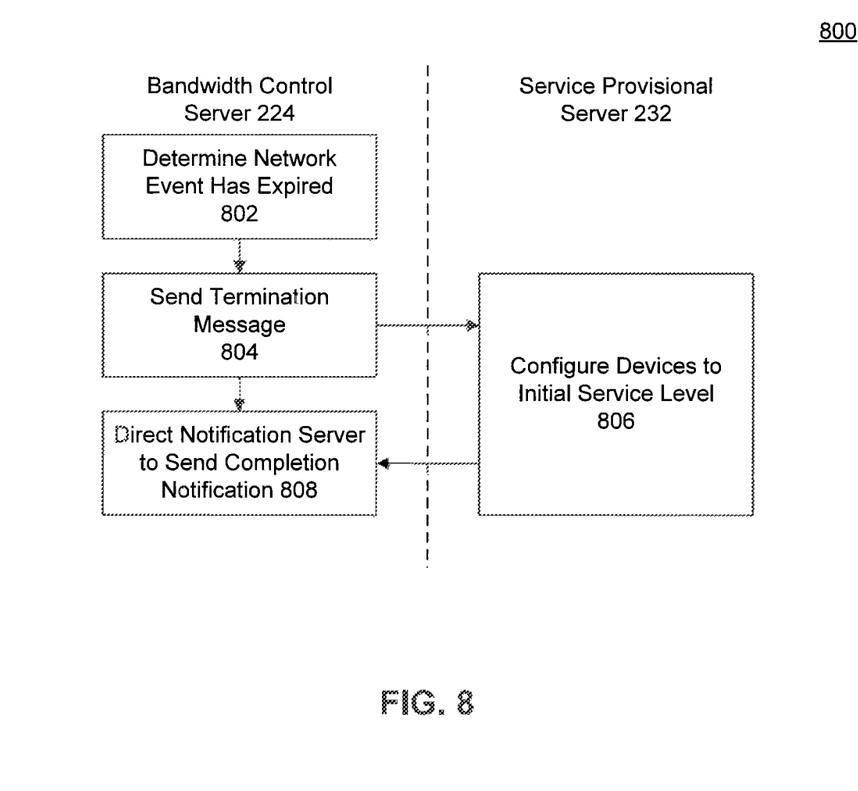
FIG. 8 is a flowchart that illustrates a method for returning a network connection to a provisioned service level when a network event has expired, which may be used in the system of FIG. 2.

FIG. 8 is a flowchart that illustrates a method 800 for returning a network connection to a provisioned service level when a network event has expired, which may be used in the system of FIG. 2. While method 800 is described with respect to the components of FIG. 2, a skilled artisan would recognize that the steps of method 800 may be executed by other components as well.

Method 800 begins at step 802 when control server 224 determines that a network events that has expired. In the running example, the bandwidth was increased at 11 am for 4 hours. Thus, in that example, at step 802, control server 224 would determine that the current time is 3 pm.

When control server 224 determines that the time for the network event has expired, control server 224 sends a termination message to service provisioning server 232 at step 804. At step 806, service provisioning server 232 configures devices to provide the initial service level, such as the initial bandwidth. Service provisioning server 232 configures the devices in the same way as described earlier with respect to FIG. 5. Finally, at step 808, bandwidth control server 224 directs the notification server to notify the user that the bandwidth is restored to the initial level.

Service Level Adjustment Based on Usage

In another embodiment, the change in the assigned bandwidth to the user's connection is based upon utilization of that connection. For example, the user can set a threshold such that, if the utilization of a connection exceeds that threshold, the system automatically triggers a request for increasing the bandwidth assigned to that connection. This embodiment is described with respect to FIGS. 9 and 10.

Figure 9:
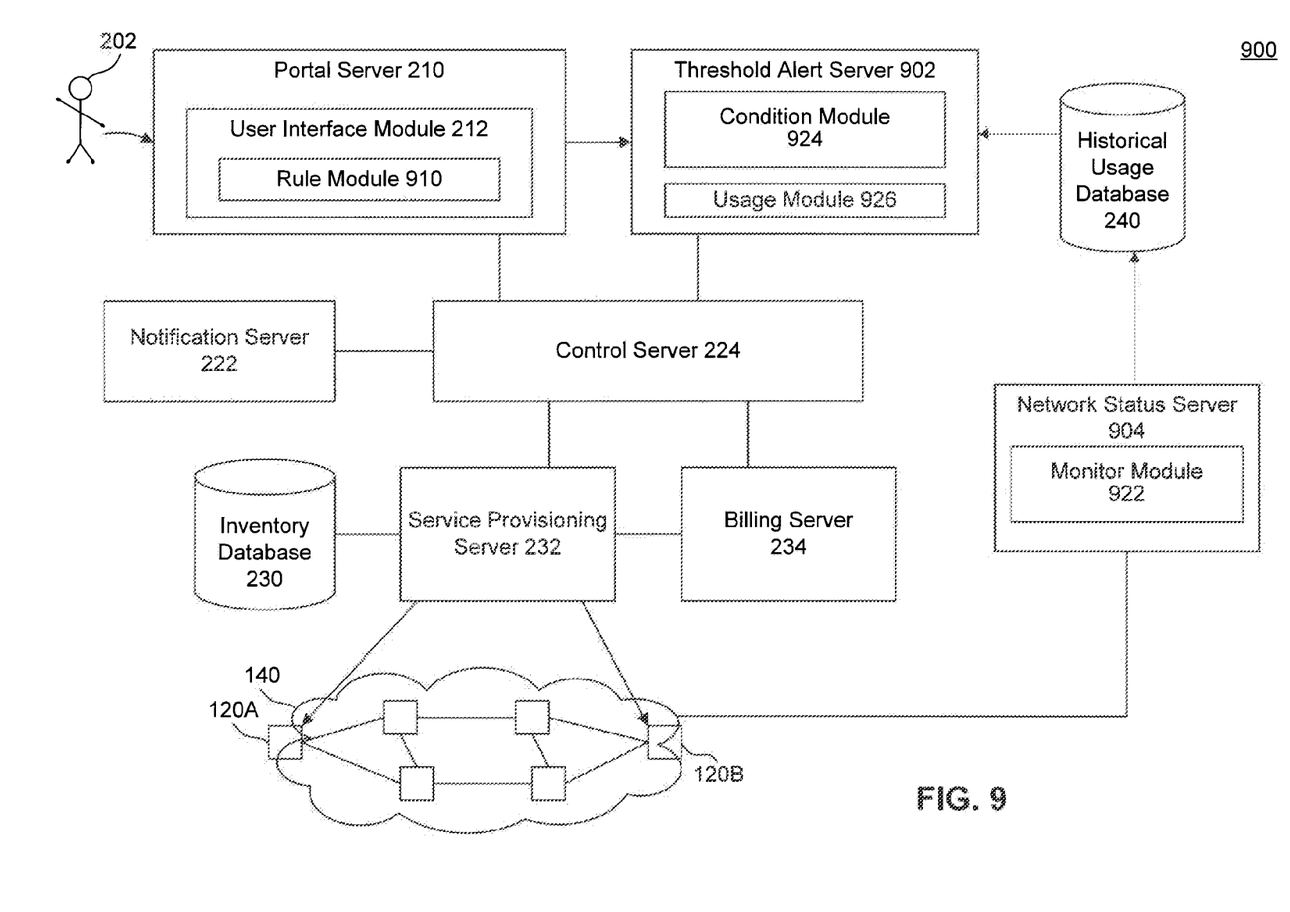
FIG. 9 is a diagram that illustrates a system for dynamically adjusting the service level of network connections based on connection utilization.

FIG. 9 shows a system 900 for dynamically adjusting bandwidth on network connections based on connection utilization. System 900 shares several components with system 200 in FIG. 2: portal server 210, user interface module 212, notification server 222, control server 224, service provisioning server 232, inventory database 230, billing server 234, and communication network 140. In addition to those components of system 200, system 900 also includes: a rule module 910, which is included in user interface module 212; a threshold alert server 902, which includes a condition module 924 and a usage module 926; and a network status server 904, which includes a monitor module 922.

Rule module 910 receives an input that identifies a network connectivity service and a rule specifying: (i) a usage metric for the network connectivity service, (ii) a condition for assessing the usage metric, and (iii) a manner for determining a new service level of the network connectivity service. In one embodiment, a rule may specify increasing the bandwidth with a constant multiplier when the connection utilization exceeds a threshold. For example, the rule may specify a threshold value for bandwidth utilization. If the actual bandwidth used exceeds the threshold value, the total bandwidth allocated to the connection may increase. It may double or may increase to a new predefined level. A skilled artisan would identify that values other than double or triple may be used (such as a 150% multiplier).

In another embodiment, the rule may specify a sliding scale. For example, the rule may indicate that whenever the bandwidth utilized on connection exceeds a particular percentage (such as 80%) of the bandwidth allocated, the bandwidth allocated is increased to a new level.

In yet another embodiment, a rule may specify that, if the utilization of a connection exceeds the threshold, the bandwidth of the connection is adjusted by predicting how much bandwidth the user will require on the given connection.

Rule module 910 sends the specified rule to threshold alert server module 902, which stores the rule. Threshold alert server module 902 monitors the network to repeatedly evaluate the usage metric and determines whether the usage metric satisfies the condition. It keeps track of the utilization of the network connectivity service. Threshold alert server module 902 may also track a quote provided by portal server 210. Threshold alert server 902 is coupled to historical usage database 240.

Historical usage database 240 stores data collected from network status server 904. Network status server 904 includes a monitor module 922 that connects to the network devices in network 140 and measures metrics such as the amount of bandwidth utilized on all ports in the network. Network status server 904 may collect the metrics by polling them periodically. Once collected, network status server 904 stores them into historical usage database 240. Historical usage database 240 keeps track of how the services looked historically.

As mentioned above, threshold alert server 902 includes condition module 924. Condition module 924 continually analyzes data from or prior to insertion into the historical usage database 240. It applies an exponential moving average filter over the data and determines if it is within a sliding window. Network utilization can vary quickly and widely. So, the moving average filter helps smooth out the utilization data. If the utilization of a connection has been over the threshold for at least a specific duration of time set by the user or service provider, condition module 924 invokes usage module 926.

When invoked, usage module 926 determines, based on the rule, the new service level. For example, the rule may state that if bandwidth utilization exceeds 80%, double the allocated bandwidth. In this example, when invoked, usage module 926 would determine the currently allocated bandwidth for the connection and double it to determine a new bandwidth value.

Once the new service level is determined, threshold alert server 902 triggers an alert to control server 224 to adjust the service level of the connection. Just as described above with respect to FIGS. 2-8, control server 224 works with service provisioning server 232 to configure the connection, notification server 222 to notify the user of the change, and billing server 234 to bill out the change.

Once the change is made, the condition module 924 continually reads data from or prior to insertion into historical usage database 240 to determine when the condition is no longer satisfied. When the condition is no longer satisfied, usage module 926 sends a message to control server 224, which reconfigures the connection back to the initial service level. Again, the network is configured as described above with respect to FIGS. 2-8.

In some embodiments, threshold alert server 902 may constantly send updated alerts to the control server 224, so that as the changes in the utilization of the connection are made, the amount of bandwidth assigned to the connection is changed as well. Consequently, the amount of bandwidth assigned to a connection will reflect the rule set in the rule module 910. For example, a user may require that the connection from Atlanta to Los Angeles have an actual utilization of less that 75% of the maximum bandwidth the connection can provide. Assuming the maximum bandwidth is 400 Mbps, the threshold alert module monitors the network repeatedly and if the used bandwidth of the connection goes above 300 Mbps, it increases the maximum bandwidth allocated to the user so that at all times the utilization of the connection is below 75%. The rule may specify, when the bandwidth utilized exceeds 75%, to increase the bandwidth utilized by 25%. In the example above, the bandwidth allocated would increase from 400 Mbps to 500 Mbps.

The user may configure another rule defining how to scale back the bandwidth utilization. For example, the rule may indicate to reduce the allocated bandwidth by 25% when the bandwidth utilized is less than 50% what is allocated. In that example, when the bandwidth utilized goes below 250 Mbps, the bandwidth allocated would be decreased from 500 Mbps to 400 Mbps. In this way, by specifying rules to both increase and decrease bandwidth, the bandwidth allocated can dynamically flex up and down.

Figure 10:
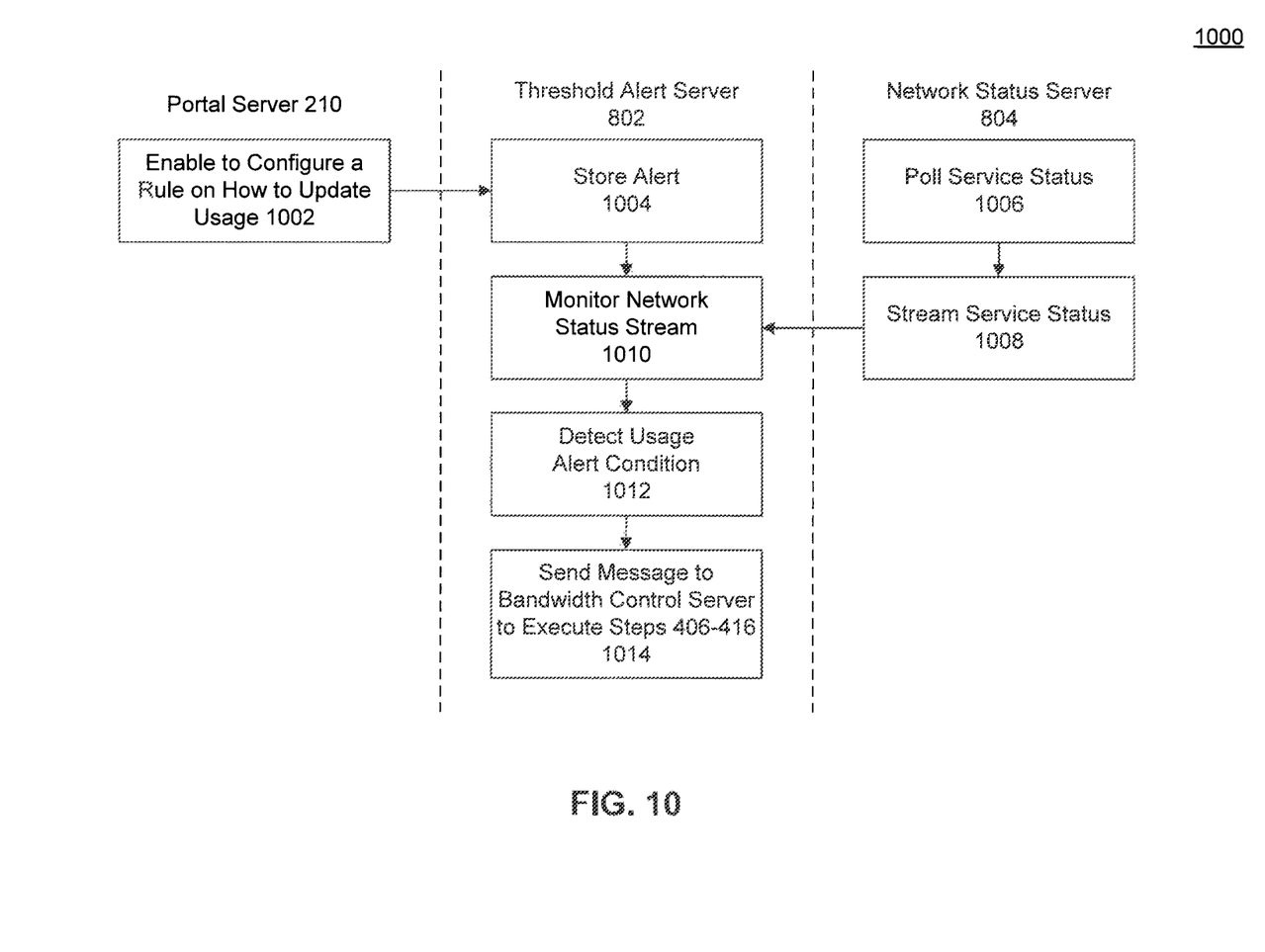
FIG. 10 is a flowchart that illustrates a method for dynamically adjusting the service level of network connections based on connection utilization, which may be used in the system of FIG. 9.

FIG. 10 is a flowchart that illustrates a method 1000 for dynamically adjusting the service level of network connections based on connection utilization. While method 1000 is described with respect to the components of FIG. 9, a skilled artisan would recognize that the steps of method 1000 may be executed by other components as well.

Portal server 210 enables the user to configure a rule on how to update usage at step 1002. Threshold alert server 802 stores an alert at step 1004 and monitors network status at step 1010. At step 1006, network status server 804 polls service status and streams service status at step 1008.

At step 1012, threshold alert server 802 detects that a usage alert condition is satisfied and sends a message to the bandwidth control server 224 to execute steps 406 to 416 of flowchart 400. Referring to the example above, any time the utilization of the connection between Atlanta to Los Angeles increases over 300 Mbps, threshold alert server 802 detects an alert in step 1012 and sends a message to control server 224 to adjust the connection bandwidth accordingly.

In another embodiment of the invention, changes in the utilization and adjusting the bandwidth are performed for each flow on a connection, rather than for the aggregated flows in a connection. In other words, the dynamic bandwidth methods described in this invention are applied to individual flows of traffic. For example, the system can provide dynamic bandwidth to web (http) traffic, which can be one slice of the aggregated traffic on a given connection.

Flow level dynamic bandwidth management allows the user to treat different flows or different types of traffic in different ways. In other words, it enables the user to use a class of service for different traffic types. For example, if a user wants to guarantee a certain bandwidth for the voice traffic, it can dynamically change the bandwidth assigned to voice traffic so that regardless of the aggregated traffic load on a connection, each flow of voice traffic enjoys a guaranteed amount of bandwidth.

A Service Level Agreement may provide different guarantees for different classes of service. For example, streaming video may require a great deal of bandwidth, but latency may be relatively unimportant. Yet, voice-over-IP data may require relatively little bandwidth, but latency may be very important. The Service Level Agreement (SLA) can be decomposed into different classes of service and service level guarantees and a rule can be generated for each.

CONCLUSION

A skilled artisan would recognize that the components of the systems in FIGS. 2 and 9 enable adjustments of network service level based both on a schedule and on usage.

Many of the examples above are provided with respect to changing bandwidth. However, a skilled artisan would recognize that these may be applied to changes in other service levels as well, such as latency or jitter. Changing latency or jitter may involve configuring individual switching devices to re-prioritize traffic. It also may involve reconfiguring a number of different switching devices to alter the flow of traffic through the network.

The term "user," as used herein, may encompass both a customer of the network connectivity service, such as an employee of a business that utilizes the network connectivity service, and a network administrator of the service provider itself. Users may also be at different companies or organizations.

Inventory database 230 and historical usage database 240 each may be any stored type of structured memory, including a persistent memory. In examples, each database may be implemented as a relational database or file system.

Each of the servers and modules in FIGS. 2 and 9 may be implemented in hardware, software, firmware, or any combination thereof.

Each of the servers and modules in FIGS. 2 and 9 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a nontransitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodi-

What is claimed is:

1. A computer-implemented method for adjusting capacity on a network, the network including a plurality of interconnected switching devices, comprising:
    (a) receiving an input that identifies a network connectivity service provisioned to a user at an initial service level and a rule specifying: (i) a usage metric for the network connectivity service, (ii) a condition for assessing the usage metric, and (iii) a manner for determining a new service level of the network connectivity service, the network connectivity service providing a dedicated network connection between at least two locations;
    (b) identifying which of the plurality of interconnected switching devices on the network need to be configured to alter the initial service level of the network connectivity service;
    (c) monitoring the network to repeatedly evaluate the usage metric;
    (d) determining that the usage metric satisfies the condition;
    when the condition is determined to be satisfied in (d):
    (e) determining the new service level of the network connectivity service in the manner specified in the rule; and
    (f) configuring each of the interconnected switching devices identified in (b) to provide the new service level.

2. The computer-implemented method of claim 1, wherein each of the initial and new service levels is a bandwidth level for the network connectivity service to provide across the network between the at least two locations.

3. The computer-implemented method of claim 2, further comprising:
    (g) determining that the usage metric no longer satisfies the condition;
    (h) when the condition is determined not to be satisfied in (g), configuring each of the interconnected switching devices identified in (b) to provide the initial service level.

4. The computer-implemented method of claim 3, wherein the manner for determining the new service level defined in the rule is to set the new service level to a predefined bandwidth level, and
    wherein the configuring (e) comprises configuring each of the interconnected switching devices identified in (b) to provide the predefined bandwidth level.

5. The computer-implemented method of claim 2, wherein the manner for determining a new service level defined in the rule is to calculate a new bandwidth based on the usage metric,
    wherein the determining (e) comprises calculating, in the manner defined in the rule, a new bandwidth based the usage metric evaluated in (c), and
    wherein the configuring (h) comprises setting policers on each of the interconnected switching devices identified in (b) to the new bandwidth.

6. The computer-implemented method of claim 5, wherein the condition for assessing the usage metric defined in the rule is to determine whether a ratio of the usage metric to an amount of usage allowed under the initial service level meets or exceeds a threshold,
    wherein the determining (d) comprises:
        determining whether a ratio of the usage metric to amount of usage allowed under the initial service level meets or exceeds a predefined threshold; and
        determining that the usage metric satisfies the condition when the ratio is determined to meet or exceed a predefined threshold.

7. The computer-implemented method of claim 6, wherein the input specifies a second rule that includes (i) a second condition for assessing whether a second ratio of the usage metric to an amount of usage allowed under the initial service level is below a second predefined threshold, and (ii) a second manner for reducing service level of the network connectivity service, and further comprising:
    (g) determining that the second ratio of the usage metric to an amount of usage allowed under the new service level is below the second predefined threshold;
    when the second condition is determined to be satisfied in (g):
    (h) determining a reduced service level of the network connectivity service in the second manner specified in the second rule; and
    (i) configuring each of the interconnected switching devices identified in (b) to provide the reduced service level;
    (j) repeating steps (c)-(i) to dynamically flex a service level of the network connectivity service up and down according to usage needs.

8. The computer-implemented method of claim 1, wherein the initial and new service levels are latency levels.

9. The computer-implemented method of claim 8, wherein the manner for determining a new service level defined in the rule is to set the new service level to comply with a service level agreement for a particular type of traffic.

10. The computer-implemented method of claim 1, wherein the determining that the usage metric satisfies the condition comprises determining whether a moving average of bandwidth utilized on the network connectivity service exceeds a threshold for a predefined duration.

11. A system for adjusting capacity on a network, the network including a plurality of interconnected switching devices, comprising:
    a user interface module that receives an input that identifies a network connectivity service provisioned to a user at an initial service level and a rule specifying: (i) a usage metric for the network connectivity service, (ii) a condition for assessing the usage metric, and (iii) a manner for determining a new service level of the network connectivity service, the network connectivity service providing a dedicated network connection between at least two locations;
    a service lookup module that identifies which of the plurality of interconnected switching devices on the network need to be configured to alter the initial service level of the network connectivity service;
    a monitor module that monitors the network to repeatedly evaluate the usage metric;
    a condition module that determines that the usage metric satisfies the condition;
    a usage module that, when the condition is determined to be satisfied, determines the new service level of the network connectivity service in the manner specified in the rule; and
    a provisioning module that, when the condition module determines that the condition is satisfied, configures each of the interconnected switching devices identified to provide the new service level.

12. The system of claim 11, wherein each of the initial and new service levels is a bandwidth level for the network connectivity service to provide across the network between the at least two locations.

13. The system of claim 12, wherein the condition module determines that the usage metric no longer satisfies the condition, and
   wherein the provisioning module, when the when the condition is determined not to be satisfied by the condition module, configures each of the interconnected switching devices identified by the service lookup module to provide the initial service level.

14. The system of claim 13, wherein the manner for determining the new service level defined in the rule is to set the new service level to a predefined bandwidth level, and
   wherein the provisioning module configures each of the interconnected switching devices to provide the predefined bandwidth level.

15. The system of claim 12, wherein the manner for determining a new service level defined in the rule is to calculate a new bandwidth based on the usage metric,
   wherein the usage module calculates, in the manner defined in the rule, a new bandwidth based the usage metric evaluated in (c), and
   wherein the provisioning module sets policers on each of the interconnected switching devices identified in (b) to the new bandwidth.

16. The system of claim 15, wherein the condition for assessing the usage metric defined in the rule is to determine whether a ratio of the usage metric to an amount of usage allowed under the initial service level meets or exceeds a threshold,
   wherein the condition module determines whether a ratio of the usage metric to amount of usage allowed under the initial service level meets or exceeds a predefined threshold and determines that the usage metric satisfies the condition when the ratio is determined to meet or exceed a predefined threshold.

17. The system of claim 16, wherein the input specifies a second rule that includes (i) a second condition for assessing whether a second ratio of the usage metric to an amount of usage allowed under the initial service level is below a second predefined threshold, and (ii) a second manner for reducing service level of the network connectivity service,
   wherein the condition module determines that the second ratio of the usage metric to an amount of usage allowed under the new service level is below the second predefined threshold,
   wherein the usage module, when the second condition is determined to be satisfied, determines a reduced service level of the network connectivity service in the second manner specified in the second rule, and
   wherein the provisioning module, when the second condition is determined to be satisfied, configures each of the interconnected switching devices identified in (b) to provide the reduced service level, and further comprising:
   a bandwidth control module that controls the monitor, condition, usage, and provisioning modules to repeatedly flex a service level of the network connectivity service up and down according to usage needs.

18. The system of claim 11, wherein the initial and new service levels are latency levels.

19. The system of claim 18, wherein the manner for determining a new service level defined in the rule is to set the new service level to comply with a service level agreement for a particular type of traffic.

20. The system of claim 11, wherein the determining that the usage metric satisfies the condition comprises determining whether a moving average of bandwidth utilized on the network connectivity service exceeds a threshold for a predefined duration.

21. A program storage device tangibly embodying a program of instructions executable by at least one machine to perform a method for adjusting capacity on a network, the network including a plurality of interconnected switching devices, the method comprising:
   (a) receiving an input that identifies a network connectivity service provisioned to a user at an initial service level and a rule specifying: (i) a usage metric for the network connectivity service, (ii) a condition for assessing the usage metric, and (iii) a manner for determining a new service level of the network connectivity service, the network connectivity service providing a dedicated network connection between at least two locations;
   (b) identifying which of the plurality of interconnected switching devices on the network need to be configured to alter the initial service level of the network connectivity service;
   (c) monitoring the network to repeatedly evaluate the usage metric;
   (d) determining that the usage metric satisfies the condition;
   when the condition is determined to be satisfied in (d):
   (e) determining the new service level of the network connectivity service in the manner specified in the rule; and
   (f) configuring each of the interconnected switching devices identified in (b) to provide the new service level.

* * * * *